(12) United States Patent
Kernan et al.

(10) Patent No.: US 8,328,523 B2
(45) Date of Patent: Dec. 11, 2012

(54) SYNCHRONOUS TORQUE BALANCE IN MULTIPLE PUMP SYSTEMS

(75) Inventors: Daniel J. Kernan, Liverpool, NY (US); Nicolas W. Ganzon, Seneca Falls, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 854 days.

(21) Appl. No.: 12/335,001

(22) Filed: Dec. 15, 2008

(65) Prior Publication Data

US 2009/0304521 A1 Dec. 10, 2009

Related U.S. Application Data

(60) Provisional application No. 61/013,685, filed on Dec. 14, 2007.

(51) Int. Cl.
*F04B 41/06* (2006.01)
(52) U.S. Cl. .......................................................... 417/5
(58) Field of Classification Search .................. 417/2, 1, 417/5
See application file for complete search history.

(56) References Cited

U.S. PATENT DOCUMENTS

| | | | |
|---|---|---|---|
| 4,308,491 A | 12/1981 | Joyner, Jr. et al. | |
| 4,502,842 A | 3/1985 | Currier et al. | |
| 5,092,824 A | 3/1992 | Connett | |
| 5,422,550 A | 6/1995 | McClanahan et al. | |
| 5,522,707 A | 6/1996 | Potter | |
| 5,789,879 A | 8/1998 | Cook | |
| 6,257,833 B1 | 7/2001 | Bates | |
| 6,499,504 B2 | 12/2002 | Wichert | |
| 7,010,393 B2 | 3/2006 | Mirsky et al. | |
| 7,080,508 B2 | 7/2006 | Stavale et al. | |
| 7,088,062 B2 | 8/2006 | Makaran | |
| 2004/0193330 A1 | 9/2004 | Mehaffey et al. | |

OTHER PUBLICATIONS

PCT/US2008/86803 International Search Report mailed Feb. 4, 2009.

*Primary Examiner* — Anh Mai
*Assistant Examiner* — Andrew Coughlin

(57) ABSTRACT

The present invention provides a new and unique method and apparatus for operating and running multiple pumps in a system together at a substantially synchronous torque to achieve a desired setpoint. Each of the multiple pumps may be operated with a variable speed drive. The present invention may also take the form of the system having the multiple pumps with a system controller for operating and running the multiple pumps, a pump for operating and running in such a system, a system control module for such a system controller, as well as a pump control module for running and operating such a pump.

36 Claims, 4 Drawing Sheets

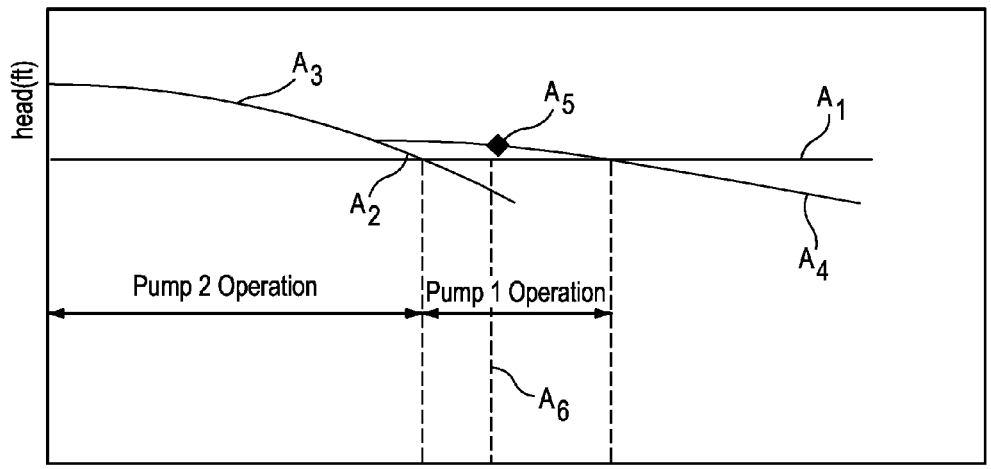
FIG. 1a
(PRIOR ART)
|        | N(rpm) | Q(gpm) | P(hp) | T(ft-lbs) | Efficiency | %BEP | Flow Balance |
|--------|--------|--------|-------|-----------|------------|------|--------------|
| Pump 1 | 1641   | 500    | 43.1  | 138       | 59%        | 54%  | 33%          |
| Pump 2 | 1780   | 1000   | 67.3  | 199       | 75%        | 100% | 67%          |
FIG. 1b
(PRIOR ART)
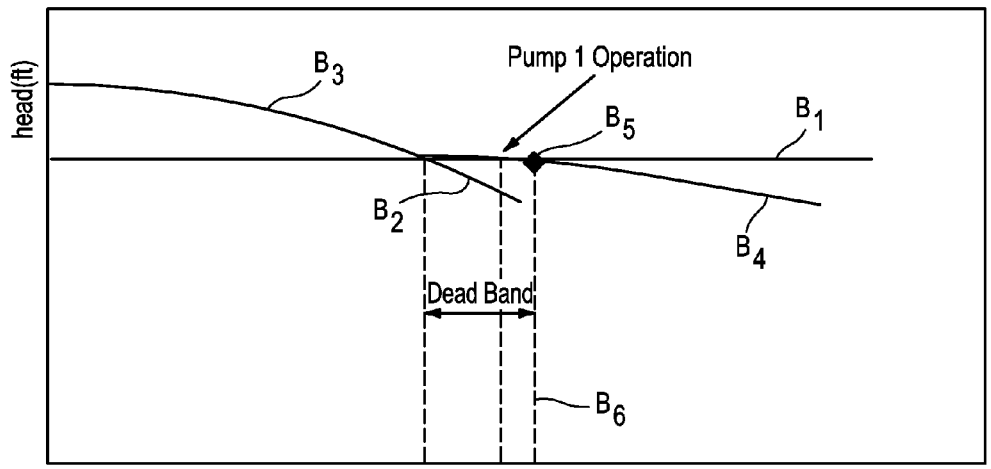
FIG. 2a
(PRIOR ART)
|        | N(rpm) | Q(gpm) | P(hp) | T(ft-lbs) | Efficiency | %BEP | Flow Balance |
|--------|--------|--------|-------|-----------|------------|------|--------------|
| Pump 1 | 1600   | 200    | 33.7  | 111       | 30%        | 22%  | 17%          |
| Pump 2 | 1780   | 1000   | 67.3  | 199       | 75%        | 100% | 83%          |
FIG. 2b
(PRIOR ART)

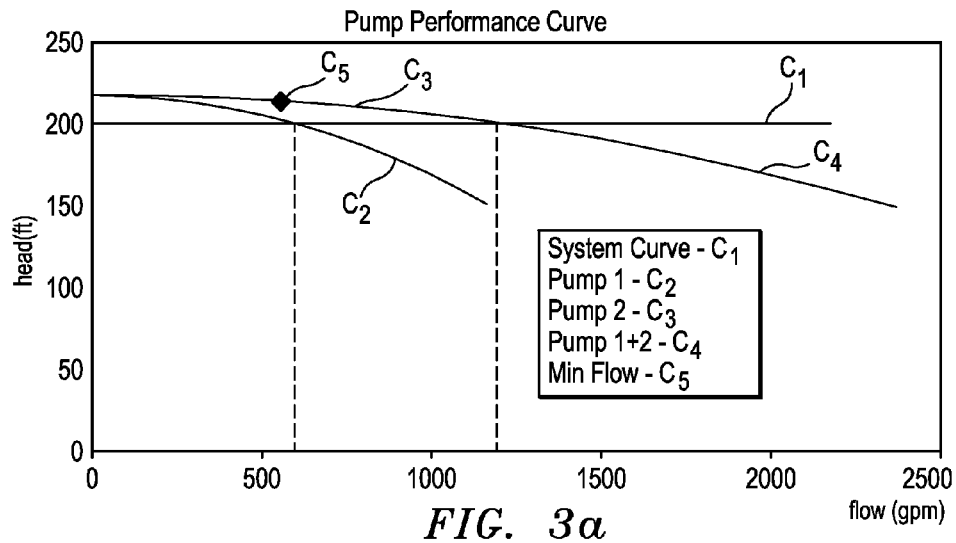
FIG. 3a
(PRIOR ART)
|        | N(rpm) | Q(gpm) | P(hp) | T(ft-lbs) | Efficiency | %BEP | Flow Balance |
|--------|--------|--------|-------|-----------|------------|------|--------------|
| Pump 1 | 1662   | 600    | 47.0  | 148       | 65%        | 64%  | 50%          |
| Pump 2 | 1662   | 600    | 47.0  | 148       | 65%        | 64%  | 50%          |
FIG. 3b
(PRIOR ART)
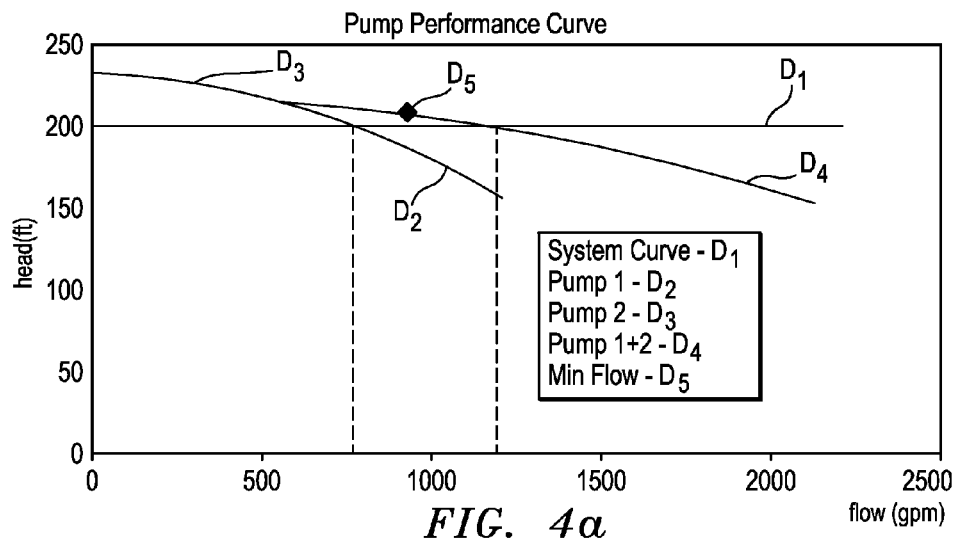
FIG. 4a
(PRIOR ART)
|        | N(rpm) | Q(gpm) | P(hp) | T(ft-lbs) | Efficiency | %BEP | Flow Balance |
|--------|--------|--------|-------|-----------|------------|------|--------------|
| Pump 1 | 1704   | 760    | 54.4  | 167       | 71%        | 80%  | 64%          |
| Pump 2 | 1704   | 430    | 46.2  | 142       | 47%        | 45%  | 36%          |
FIG. 4b
(PRIOR ART)

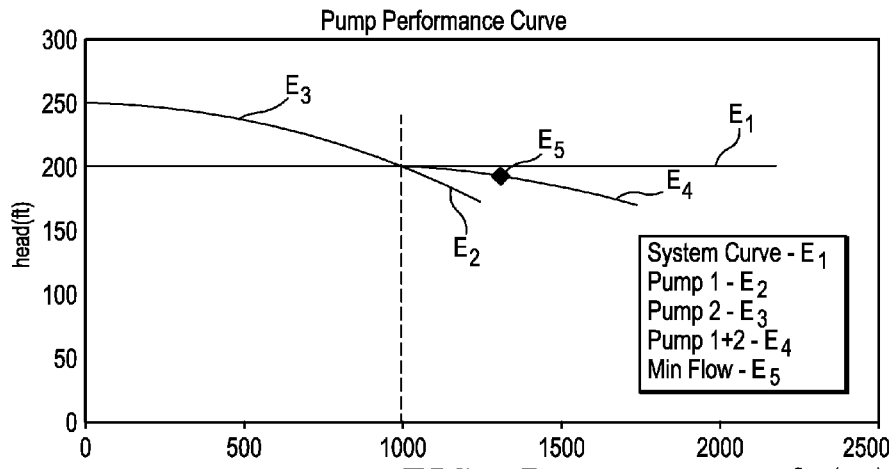
FIG. 5a
(PRIOR ART)
|        | N(rpm) | Q(gpm) | P(hp) | T(ft-lbs) | Efficiency | %BEP | Flow Balance |
|--------|--------|--------|-------|-----------|------------|------|--------------|
| Pump 1 | 1780   | 1000   | 67.3  | 199       | 75%        | 100% | 100%         |
| Pump 2 | 1780   | 0      | 40.4  | 119       | 0%         | 0%   | 0%           |
FIG. 5b
(PRIOR ART)
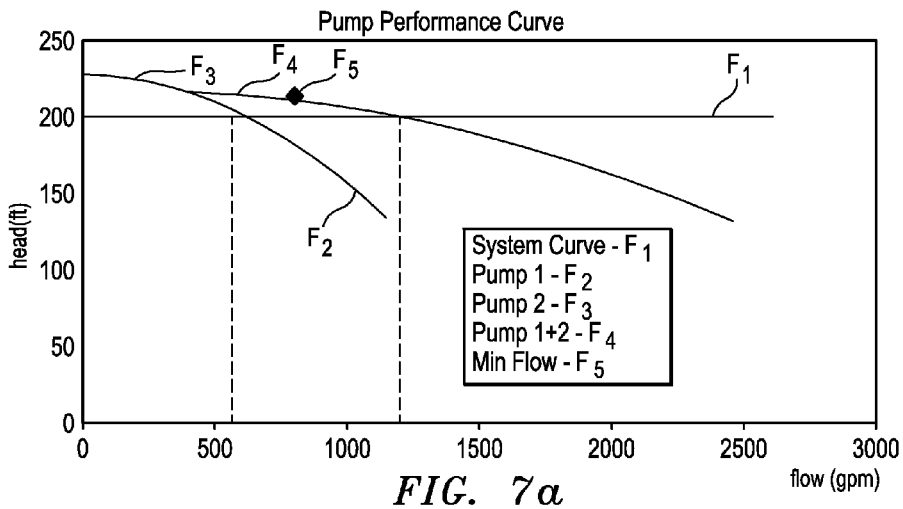
FIG. 7a
|        | N(rpm) | Q(gpm) | P(hp) | T(ft-lbs) | Efficiency | %BEP | Flow Balance |
|--------|--------|--------|-------|-----------|------------|------|--------------|
| Pump 1 | 1657   | 572    | 46.0  | 146       | 63%        | 61%  | 48%          |
| Pump 2 | 1761   | 624    | 48.8  | 146       | 65%        | 63%  | 52%          |
FIG. 7b

SYNCHRONOUS TORQUE BALANCE IN MULTIPLE PUMP SYSTEMS

CROSS-REFERENCE TO RELATED APPLICATIONS

This application claims benefit to provisional patent application Ser. No. 61/013,685, filed 14 Dec. 2007, which is hereby incorporated by reference in its entirety.

BACKGROUND OF THE INVENTION

1. Field of the Invention

The present invention relates to a method and apparatus for control in a system having multiple pumps.

2. Brief Description of Related Art

There are known devices or controllers that include, but are not limited to, Programmable Logic Controllers (PLC), Distributed Control Systems (DCS), Supervisory Control and Data Acquisition (SCADA) Systems or Variable Speed Drive Macros which coordinate the control of a multiple pump system. These controllers typically use two methods of control that can negatively affect overall pump performance and efficiency as follows:

Fixed Speed Pumps with Variable Speed Trim Pump and Multiple Pump Synchronous Speed.

Shortcomings of these known devices or controllers include the following:

Fixed Speed Pumps with Variable Speed Trim Pump

In this method of control in a multiple pump system, slave pump(s) are operated at a fixed maximum speed and one master trim pump is operated by a variable speed drive which varies the speed of this pump to trim or make up the difference to meet the desired setpoint; typically level, pressure or flow control. The master pump determines how many fixed speed slave drives should be staged or destaged.

The shortcoming of this method of control is that by basic pump system hydraulics the variable speed trim pump must generate enough head pressure to overcome the pressure in which the fixed speed pump is providing into the discharge header. In order for the trim pump to generate the required pressure at the reduced speed, the variable speed trim pump will be forced back on the pump performance curve which can cause lower operating efficiencies and decreased reliability. This type of control leads to a flow imbalance between the fixed speed pump and variable speed trim pump. In the worst case the variable speed trim pump may operate in a shutoff or deadhead condition.

FIG. 1 depicts a two pump parallel system of identical pumps maintaining a constant head pressure of 200 ft with a demand of 1500 gpm. Pump 2 is operated at a maximum fixed speed of 1780 rpm and generates 1000 gpm. Pump 1 is used as the trim pump to make up the difference in flow which operates at 1641 rpm at 500 gpm. This represents a 2:1 flow imbalance between the pumps. The result of this flow imbalance is Pump 1 running at 54% of the best efficiency point (BEP) and at a lower pumping efficiency compared to Pump 1. Both these factors can lead to higher operating cost and decreased pump reliability.

Ultimately, this method leads to a flow dead band in which the only option to operate within this dead band region is to operate the trim pump below the manufactures recommended minimum flow.

FIG. 2 depicts that same pump system as described in FIG. 1 with the exception that the flow demand has been changed to 1200 gpm. Pump 2 is running at a fixed maximum speed and can only produce 1000 gpm. In this system Pump 1 must make up the additional 200 gpm. This results in Pump 1 operating in the flow dead band region below the recommended minimum flow for the pump.

In conclusion, this form of multi-pump control can lead to flow imbalances between the fixed speed and variable speed trim pump. This imbalance results in the trim pump being forced back on the pump performance curve which leads to lower pumping efficiencies, decreased pump reliability and uneven wear between the pumps.

Examples of such known devices that contain this type of control include: ABB Pump Control Application Program for ACS800 Variable Speed Drive, and ABB Pump and Fan Application for ACH550 Variable Speed Drive.

Multiple Pump Synchronous Speed

In this method of control in a multiple pump system, all pumps are operated with a variable speed drive and run together at a synchronous speed to achieve the desired setpoint. The objective of Synchronous Speed Control is to balance the flow of all pumps equally by having all pumps run at the same speed. However, in practice this may not necessarily result in balanced flow.

As demonstrated in FIG. 3, the pumps are identical and maintaining a constant head pressure of 200 ft with a demand of 1200 gpm. To meet the demand of the system both pumps run at the same speed balancing the flow between the pumps and sharing the loads equally. Additionally an operation flow dead band is avoided.

The shortcoming of this method is in order to achieve a flow balance between the pumps the head curve of the pumps must be identical or very closely matched. In theory this method should always maintain a balance flow between the pumps provide they are identical and hydraulically and mechanically wear evenly. However, in practice this situation can be very difficult to maintain as pumps can wear unevenly or a pump with slightly different hydraulics can be added to a pump system at a different time. It is these factors that can lead to a flow imbalance between the pumps and in a severe case lead to a pump not producing any flow.

FIG. 4 depicts an identical system to FIG. 3 with the exception that Pump 2 is demonstrating 7% wear. When Pump 1 and Pump 2 had identical hydraulics the flow was balanced 1:1. In this example running the pumps together at a synchronous speed results in a 2:1 flow imbalance. Because Pump 2 can not generate the same head as Pump 1 it is forced back on the pump performance curve to compensate which lowers the pump efficiency and decreases pump reliability.

In a severe case (FIG. 5) in which Pump 2 demonstrates a 20% loss in head capacity Pump 1 will completely over power Pump 2. In this situation Pump 2 will not be able to overcome the pressure generated by Pump 1 and will produce no flow causing a dead head situation.

In conclusion, while the Synchronous Speed Control known in the art is intended to balance the flow between pumps in parallel it relies on pumps having identical head capacity curves. Any deviation from this such as pump wear or using pumps with different hydraulics will result in a flow imbalance and in extreme circumstances a no flow situation.

Examples of devices that contain this type of control include: MULTITRODE MultiSmart Pump Controller/RTU, ITT PS200 Variable Speed Drive, and ITT Aquavar CPC Variable Speed Drive In view of this, there is a need in the industry for a technique or device for balancing the flow between multiple pumps in a system.

SUMMARY OF THE INVENTION

The present invention provides a new and unique method and apparatus for operating and running multiple pumps in a system together at a substantially synchronous torque to achieve a desired setpoint. Each of the multiple pumps may be operated with a variable speed drive.

The apparatus of the present invention may take the form of a system having the multiple pumps with a system controller for operating and running the multiple pumps, the pump for operating and running in such a system, a system control module for such a system controller, as well as a pump control module for running and operating such a pump.

According to the present invention, the flow of the multiple pumps is substantially balanced even when pumps have different hydraulic head curves, including the multiple pumps having nearly 1:1 flow balance.

Each respective pump may be controlled by a respective variable speed device that is configured to calculate a respective torque of a respective load of the respective pump, or each pump may be is controlled by any suitable respective device that can vary the speed of the pump.

The method may also include providing a process variable and setpoint as inputs to a system controller, where the system controller includes either a PLC, DCS System, SCADA System or Variable Speed Drive. The system controller may be configured with logic that recognizes an error from the process variable to the setpoint and instructs a respective pump to increase or decrease torque and/or speed to maintain a desired setpoint, may be configured to recognize when an additional pump should be brought online or taken offline to match the demand of the system.

The system controller may be configured to instruct a lead pump to increase or decrease torque/speed to meet the setpoint, and/or lag pumps will match torques to the lead pump and operate together in a synchronous torque mode, when the multiple pumps are running.

In operation, the technique or device according to the present invention provides for balancing the flow between multiple pumps in the system.

BRIEF DESCRIPTION OF THE DRAWING

The drawing includes the following Figures:

FIG. 1, including FIGS. 1a and 1b, is a graph and a table of a two pump parallel system known in the art of identical pumps with one pump running at a fixed maximum speed and the other pump is running in a variable speed mode maintaining a constant head pressure of 200 ft with a demand of 1500 gpm.

FIG. 2, including FIGS. 2a and 2b, is a graph and a table of the same pump system as shown in FIG. 1 with the exception that the flow demand has been changed to 1200 gpm.

FIG. 3, including FIGS. 3a and 3b, is a graph and a table of pumps that are identical with both pumps running in a synchronous variable speed mode maintaining a constant head pressure of 200 ft with a demand of 1200 gpm.

FIG. 4, including FIGS. 4a and 4b, is a graph and a table of an identical system to that shown in FIG. 3 with the exception that Pump 2 is demonstrating 7% wear. FIG. 5, including FIGS. 5a and 5b, is a graph of an identical system to that shown in FIG. 4 with the exception that Pump 2 is demonstrating 20% wear.

FIG. 7, including FIGS. 7a and 7b, is a graph of an identical system to that shown in FIG. 4 with the exception that both pumps are run in a synchronous torque mode.

DETAILED DESCRIPTION OF THE INVENTION

Synchronous Torque Control

Figure 6:
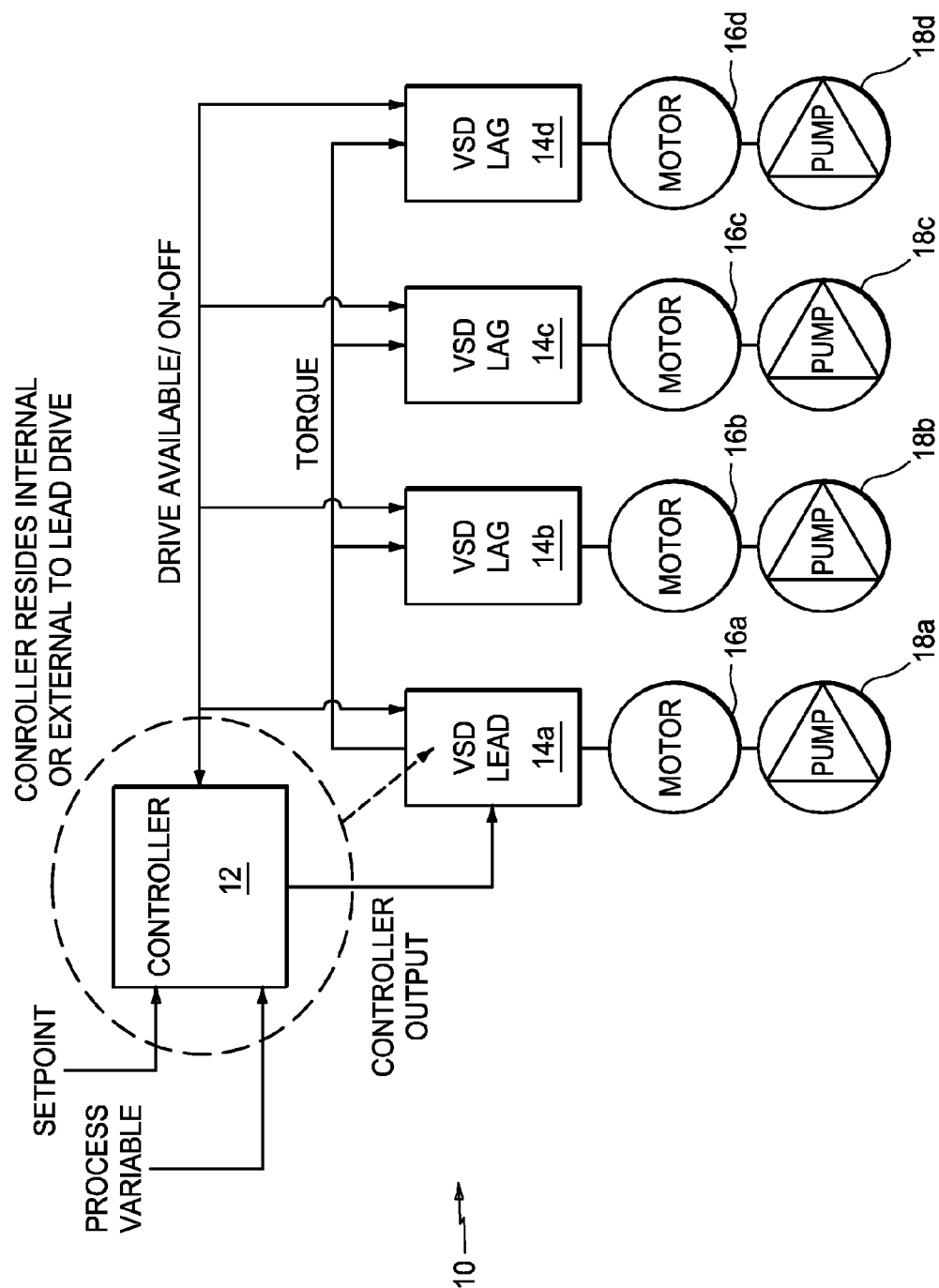
FIG. 6 is a functional block diagram of a controller in the form, but not limited to, a VFD, PLC, DCS system, SCADA system that reads a process variable and determines the number of pumps required and at what torque to run the pumps in order to maintain the desired setpoint.

FIG. 6 is a functional block diagram of a system according to the present invention and generally indicated as 10 having a controller 12 that may take the form of, but not limited to, a VFD, PLC, DCS system, SCADA system that reads a process variable and determines the number of pumps required and at what torque to run the pumps in order to maintain a desired setpoint. The controller 12 is coupled to four variable speed drives (VSDs) 14a, 14b, 14c, 14d; four motors 16a, 16b, 16c, 16d; and four pumps 18a, 18b, 18c, 18d. As shown, the variable speed drive 14a is a lead VSD. The system is described by way of example having four variable speed drives (VSDs), motors and pumps, although the scope of the invention is not intended to be limited to the number of variable speed drives (VSDs), motors and pumps. Embodiments are envisioned, and the scope of the invention is intended to include, systems having a different number of variable speed drives (VSDs), motors and pumps, including a numbers such as two, three, five, six, etc. Moreover, variable speed drives (VSDs), motors and pumps are all known in the art, and the scope of the invention is not intended to be limited to any particular type or kind thereof either now known or later developed in the future.

In operation, as shown the controller 12 is configured to receive signalling containing information about a setpoint and/or one or more process variables, and to provide a controller output to the lead VSD 14a. In response, the lead VSD 14a is configured to provide one or more torque signals to the other three variable speed drives (VSDs) 14b, 14c, 14d. As shown, the controller 12 and the four VSDs 14a, 14b, 14c, 14d are also configured to exchange drive available/on-off signalling. The system is described by way of example with the controller 12 configured to receive signalling containing information about the setpoint and the one or more process variables; however, the scope of the invention is not intended to be limited to the type or kind of information received by the controller 12. For example, embodiments are envisioned within the scope of the invention in which the controller is configured to receive signalling containing other types or kinds of information either now known or later developed in the future.

The lead VSD 14a is configured to respond to the controller output, and the other three VSDs 14a, 14b, 14c, 14d are configured to respond to the one or more torque signals, and the four VSDs 14a, 14b, 14c, 14d are configured to provide respective VSD signalling containing information about variable speeds for driving the four motors 16a, 16b, 16c, 16d. The four motors 16a, 16b, 16c, 16d are configured to respond to respective VSD signalling and to drive the four pumps 18a, 18b, 18c, 18d.

As shown, and indicated by the circled hatched lines, the controller 12 may reside internal or external to the lead VSD 14a. Moreover, the scope of the invention is not intended to be limited to where the multipump controller 12 is implemented within the overall system 10.

In this method of control in a multiple pump system according to the present invention, all four pumps 18a, 18b, 18c, 18d may be operated with a variable speed drive (VSD) and run together at a substantially synchronous torque to achieve the desired setpoint. The objective of Synchronous Speed Torque is to balance the flow of the four pumps 18a, 18b, 18c, 18d even when the four pumps 18a, 18b, 18c, 18d have different hydraulic head curves.

In one particular application, the term Substantially Synchronous Torque is understood to mean that the driven equipment, such as a pump, is operated in a manner as such the operating torques of the driven equipment are substantially balanced within, for example, a minimum range of about 95% of the true operating torque between the driven equipment. To achieve Substantially Synchronous Torque Control, the controller 12 will continuously update and communicate an identical torque setpoint to each piece of driven equipment as determined necessary to maintain the desired feedback of a pump system. The driven equipment will then feedback the true operating torque to the controller to confirm each piece of driven equipment is operating within the required about 95% operating window. However, it is noteworthy that the scope of the invention is not intended to be limited to any particular percentage in order to achieve Substantially Synchronous Torque according to the present invention. For example, as a person skilled in the art would appreciate, depending on the type or kind of application, including those now known or later developed in the future, embodiments of the invention may include using another percentage above or below about 95% and still operate within the spirit of the present invention.

By balancing the torque between the four pumps 18a, 18b, 18c, 18d, the work load can be divided between the pumps 18a, 18b, 18c, 18d which yield a much better flow balance. By examining the same pump system as depicted in FIG. 4, where two pumps in synchronous speed control are pumping in parallel and Pump 2 is demonstrating a 7% degradation in head due to wear, a flow imbalance occurs of nearly 2:1. If this same system is placed in substantially Synchronous Torque according to the present invention, the result would be a nearly 1:1 flow balance. As depicted in FIG. 7, the pumps are running at the same torque of 146 ft-lbs, as a result the pumps run at a 104 rpm differential and produce a near 1:1 flow balance.

This form of control allows pumps to be operated in parallel that experience mechanical and hydraulic wear, have different impeller trims, have different head performance curves or are even manufactured by different pump manufactures.

Each pump is controlled by a variable speed device that has the ability to calculate the torque of the drive's load, in this case the pump. Typically, a variable frequency drive is used as the variable speed device, but this control method is applicable to any device that can vary the pump speed. In this system, torque is expressed in real units such as ft-lbs, in-lbs or N-m. Torque should not be expressed as a percentage of motor full load motor torque as this would limit the functionality to only using identical motors or motors that generate the same full load torque. However, if the motors are identical expressing torque as a percentage of full load would be acceptable to use.

The system operates in which a process variable and setpoint are input to a system controller. This system controller can be in the form of but, not limited to a PLC, DCS System, SCADA System or Variable Speed Drive. The system controller is configured to contain some form of logic that recognizes the error from the process variable to the setpoint and instructs a pump to increase or decrease torque and/or speed to maintain the desired setpoint. This system controller is also configured to contain an ability to recognize when an additional pump should be brought online or taken offline to match the system demand.

When multiple pumps are running, the system controller shall instruct a lead pump to increase or decrease torque/speed to meet the setpoint. Lag pumps will match torques to the lead pump and operate together in a synchronous torque mode. Figure G depicts the control layout for a four pump system.

Exceptions

In this mode, the pumps shall always maintain substantially the same torques levels with the following exceptions in which case the synchronous torque mode will be overridden by synchronous speed control, as follows:
1. All available pumps are running and the setpoint cannot be met and at least one lag unit is not at maximum speed.
2. A lag pump unit is at maximum speed and cannot attain synchronous torque.

If all of these conditions occur, then the lag pumps shall synchronize speeds with the lead pump to allow the lag pumps to get to maximum speed. This override allows the pumps to generate maximum output while sacrificing the flow balance of the pumps. This override function shall be user selectable.

One Implementation of the Multipump Controller 12

Consistent with that described above, the functionality of the multipump controller 12 may be implemented with one or more modules using hardware, software, firmware, or a combination thereof. In a typical software implementation, the one or more modules that form part of the multipump controller 12 would include one or more microprocessor-based architectures having a microprocessor, a random access memory (RAM), a read only memory (ROM), input/output devices and control, data and address buses connecting the same. A person skilled in the art would appreciate and be able to program such a microprocessor-based implementation to perform the functionality described herein without undue experimentation. The scope of the invention is not intended to be limited to any particular implementation using some combination of hardware, software, or firmware technology either now known or later developed in the future.

The Multipump Controller 12 as a Chipset

In some embodiments according to the present invention, the one or more modules of the controller may also form part of a basic chipset implementation. The present invention may also take the form of the chipset that may include a number of integrated circuits designed to perform one or more related functions, including a chipset or chip formed as a group of integrated circuits, or chips, that are designed to work together. For example, one chipset may provide the basic functions of the overall controller, while another chipset may provide control processing unit (CPU) functions for a computer or processor in overall controller. Newer chipsets generally include functions provided by two or more older chipsets. In some cases, older chipsets that required two or more physical chips can be replaced with a chipset on one chip. The term "chipset" is also intended to include the core functionality of a motherboard in such a controller.

Possible Applications

Other possible applications include at least the following: Synchronous Torque Control can be applied to multiple pump systems in parallel or in series. Additionally this logic can be applied to multiple fan/blower systems.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

We claim:

1. A method of control in a system having multiple pumps, wherein the multiple pumps are operated and run together at a substantially synchronous torque to achieve a desired setpoint, wherein the method comprises:
    responding with a controller to signaling containing information about the desired setpoint, and providing a control output signal;
    responding with a lead variable speed drive to the control output signal, providing a lead variable speed drive signal for driving one of the multiple pumps, and also providing one or more torque signals; and
    responding with a lag variable speed drive to the one or more torque signals, and providing a lag variable speed drive signal for driving another one of the multiple pumps;
    the one or more torque signals containing information so that the lead variable speed drive and the lag variable speed drive operate and run the multiple pumps together at the substantially synchronous torque to achieve the desired setpoint.

2. A method according, to claim 1, wherein the flow of the multiple pumps is substantially balanced even when pumps have different hydraulic head curves.

3. A method according to claim 1, wherein the multiple pumps have nearly 1:1 flow balance.

4. A method according to claim 1, wherein each respective pump is controlled by a respective variable speed device that is configured to calculate a respective torque of a respective load of the respective pump.

5. A method according to claim 1, wherein each pump is controlled by a respective suitable device that can vary the speed of the pump.

6. A method according to claim 1, wherein the method includes providing a process variable and setpoint as inputs to a system controller.

7. A method according to claim 6, wherein the system controller includes either a PLC, DCS System, SCADA System or Variable Speed Drive.

8. A method according to claim 6, wherein the system controller contains logic that recognizes an error from the process variable to the setpoint and instructs a respective pump to increase or decrease torque and/or speed to maintain a desired setpoint.

9. A method according to claim 6, wherein the system controller is configured to recognize when an additional pump should be brought online or taken offline to match the demand of the system.

10. A method according to claim 6, wherein the system controller is configured to instruct a lead pump to increase or decrease torque/speed to meet the setpoint when the multiple pumps are running.

11. A method according to claim 10, wherein lag pumps will match torques to the lead pump and operate together in a synchronous torque mode when the multiple pumps are running.

12. A system having multiple pumps, wherein the multiple pumps are operated and run together at a substantially synchronous torque to achieve a desired setpoint, wherein the system comprises:
    a controller configured to respond to signaling containing information about the desired setpoint, and to provide a control output signal;
    a lead variable speed drive configured to respond to the control output signal, to provide a lead variable speed drive signal for driving one of the multiple pumps, and also to provide one or more torque signals; and
    a lag variable speed drive configured to respond to the one or more torque signals, and to provide a lag variable speed drive signal for driving another one of the multiple pumps,
    the one or more toque signals containing information so that the lead variable speed drive and the lag variable speed drive operate and run the multiple pumps together at the substantially synchronous torque to achieve the desired setpoint.

13. A system according to claim 12, wherein the flow of the multiple pumps is substantially balanced even when pumps have different hydraulic head curves.

14. A system according to claim 12, wherein the multiple pumps have nearly 1:1 flow balance.

15. A system according to claim 12, wherein each pump is controlled by a respective variable speed device that is configured to calculate a respective torque of a respective load of the respective pump.

16. A system according to claim 12, wherein each pump is controlled by a respective device that can vary the speed of the pump.

17. A system according to claim 12, wherein the system has a system controller that receives a process variable and setpoint as inputs.

18. A system according to claim 17, wherein the system controller includes either a PLC, DCS System, SCADA System or Variable Speed Drive.

19. A system according to claim 17, wherein the system controller contains logic that recognizes an error from the process variable to the setpoint and instructs a respective pump to increase or decrease torque and/or speed to maintain a desired setpoint.

20. A system according to claim 17, wherein the system controller is configured to recognize when an additional pump should be brought online or taken offline to match the demand of the system.

21. A system according to claim 17, wherein the system controller is configured to instruct a lead pump to increase or decrease torque/speed to meet the setpoint when the multiple pumps are running.

22. A system according to claim 21, wherein lag pumps will match torques to the lead pump and operate together in a synchronous torque mode when the multiple pumps are running.

23. A pump for forming part of a system having multiple pumps, wherein the pump comprises a module configured to operate and run the pump at, a substantially synchronous torque to achieve a desired setpoint together with one or more other pumps in the system, wherein the pump comprises:
- a controller configured to respond to signaling containing information about the desired setpoint, and to provide a control output signal; and
- a lead variable speed drive configured to respond to the control output signal, to provide a lead variable speed drive signal for driving one of the multiple pumps, and also to provide one or more torque signals to be received by a lag variable speed drive for driving another one of the multiple pumps;
- the one or more torque signals containing information so that the lead variable speed drive and the lag variable speed drive operate and run the multiple pumps together at the substantially synchronous torque to achieve the desired set point.

24. A pump according to claim 23, wherein the flow of the pump is substantially balanced with the flow of the one or more other pumps even when the multiple pumps have different hydraulic head curves.

25. A pump according to claim 23, wherein the flow of the pump is substantially balanced with the flow of the one or more other pumps so that the multiple pumps have nearly 1:1 flow balance.

26. A pump according to claim 23, wherein the module includes a variable speed device that is configured to calculate a respective torque of a respective load of the respective pump.

27. A pump according to claim 23, wherein the module includes a respective device that can vary the speed of the pump.

28. A pump according to claim 23, wherein the module receives signals from a system controller that receives a process variable and setpoint.

29. A pump according to claim 28, wherein the system controller is either a PLC, DCS System, SCADA System or Variable Speed Drive.

30. A pump according to claim 28, wherein the system controller contains logic that recognizes an error from the process variable to the setpoint and instructs the pump to increase or decrease torque and/or speed to maintain a desired setpoint.

31. A pump according to claim 28, wherein the system controller is configured to recognize when an additional pump should be brought online or taken offline to match the demand of the system.

32. A pump according to claim 28, wherein if the pump is a lead pump, then the system controller is configured to instruct the lead pump to increase or decrease torque/speed to meet the setpoint when the multiple pumps are running, and the module is configured to respond to that instruction.

33. A pump according to claim 32, wherein if the pump is a lag pump, then one or more lag pumps in the system will match torques to the lead pump and operate together in a synchronous torque mode when the multiple pumps are running.

34. A system control module for controlling a system having multiple pumps, wherein the system control module is configured to operate and run multiple pumps together at a substantially synchronous torque to achieve a desired setpoint, wherein the system control module comprises:
- a controller configured to respond to signaling containing information about the desired setpoint, and to provide a control output signal;
- a lead variable speed drive configured to respond to the control output signal, to provide a lead variable speed drive signal for driving one of the multiple pumps, and also to provide one or more torque signals; and
- a lag variable speed drive configured to respond to the one or more torque signals, and to provide a lag variable speed drive for driving another one of the multiple pumps,
- the one or more torque signals containing information so that the lead variable speed drive and the lag variable speed drive operate and run the multiple pumps together at the substantially synchronous torque to achieve the desired setpoint.

35. A pump control module for a pump for forming part of a system having multiple pumps, wherein the pump control module is configured to respond to a control signal from a system controller, and is configured to operate and run the pump at a substantially synchronous torque to achieve a desired setpoint together with one or more other pumps in the system, wherein the system comprises:
- a controller configured to respond to signaling containing information about the desired setpoint, and to provide a control output signal; and
- a lead variable speed drive configured to respond to the control output signal, to provide a lead variable speed drive signal for driving one of the multiple pumps, and also to provide one or more torque signals to be received by a lag variable speed drive for driving another one of the multiple pumps,
- the one or more torque signals containing information so that the lead variable speed drive and the lag variable speed drive can operate and run the multiple pumps together at the substantially synchronous torque to achieve the desired setpoint.

36. A pump control module for a pump for forming part of a system having multiple pumps,
- wherein the pump control module is configured to respond to a control signal from a system controller, and is configure to operate and run the pump at a substantially synchronous torque to achieve a desired setpoint together with one or more other pumps in the system; and
- wherein the pump control module comprises:
- a lag variable speed drive configured to respond to one or more torque signals to be provided by a lead variable speed drive for driving one of the multiple pumps, and to provide a lag variable speed drive signal for driving another one of the multiple pumps,
- the one or more torque signals containing information so that the lag variable speed drive and the lead variable speed drive can operate and run the multiple pumps together at the substantially synchronous torque to achieve the desired setpoint.

* * * * *